US009880356B2

(12) United States Patent
Latawiec et al.

(10) Patent No.: US 9,880,356 B2
(45) Date of Patent: Jan. 30, 2018

(54) APPARATUS FOR COUPLING TO HIGH-INDEX MICRO-RESONATORS WITH TAPERED OPTICAL FIBERS

(71) Applicant: President and Fellows of Harvard College, Cambridge, MA (US)

(72) Inventors: Pawel M. Latawiec, Allston, MA (US); Marko Loncar, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 0 days.

(21) Appl. No.: 15/151,304

(22) Filed: May 10, 2016

(65) Prior Publication Data

US 2017/0329086 A1     Nov. 16, 2017

(51) Int. Cl.
| | |
|---|---|
| G02B 6/30 | (2006.01) |
| G02B 6/26 | (2006.01) |
| G02B 6/293 | (2006.01) |
| G02B 6/122 | (2006.01) |
| G02B 6/28 | (2006.01) |
| G02B 6/12 | (2006.01) |

(52) U.S. Cl.
CPC ....... *G02B 6/29341* (2013.01); *G02B 6/1228* (2013.01); *G02B 6/2852* (2013.01); *G02B 6/29335* (2013.01); *G02B 6/29338* (2013.01); *G02B 6/305* (2013.01); *G02B 2006/12038* (2013.01); *G02B 2006/12111* (2013.01); *G02B 2006/12152* (2013.01); *G02B 2006/12195* (2013.01)

(58) Field of Classification Search
CPC ............................ G02B 6/29341; G02B 6/305
See application file for complete search history.

(56) References Cited

U.S. PATENT DOCUMENTS

| | | | | |
|---|---|---|---|---|
| 6,633,696 | B1 * | 10/2003 | Vahala | B82Y 20/00 385/1 |
| 6,879,752 | B1 * | 4/2005 | Ilchenko | G02B 6/12007 385/30 |
| 7,421,173 | B2 * | 9/2008 | Mazur | C03B 37/025 385/123 |
| 9,746,612 | B2 * | 8/2017 | Lipson | G02B 6/30 |

(Continued)

OTHER PUBLICATIONS

Barclay et al. "Evanescent coupling from optical fiber tapers to photonic crystal waveguides and resonators", Optical Society of America, CLEO 2003.*

(Continued)

*Primary Examiner* — Michelle R Connelly
(74) *Attorney, Agent, or Firm* — Alexander Akhiezer; Erik Huestis; Foley Hoag LLP

(57) ABSTRACT

Tapered waveguides made of high-index material attached to a tapered optical fiber are provided, enabling access to the optical modes of large, high-index resonators. In some embodiments, an optical fiber having a central axis, a tapered portion, and an untapered portion is provided. The tapered portion is configured to expose an evanescent field. An elongated waveguide is optically coupled to the optical fiber along the tapered portion and parallel to the central axis of the optical fiber. The elongated waveguide has a substantially triangular cross section perpendicular to the central axis of the optical fiber.

15 Claims, 23 Drawing Sheets

(56) References Cited

U.S. PATENT DOCUMENTS

| | | | |
|---|---|---|---|
| 2007/0269901 A1* | 11/2007 | Armani | G01N 21/7746 436/172 |
| 2008/0089367 A1* | 4/2008 | Srinivasan | B82Y 20/00 372/19 |
| 2010/0142887 A1* | 6/2010 | Digonnet | B82Y 20/00 385/16 |
| 2016/0131844 A1* | 5/2016 | Yang | G02B 6/12007 359/330 |
| 2017/0205583 A1* | 7/2017 | Bennett | G02B 6/02033 |

OTHER PUBLICATIONS

Groblacher, et al., Highly efficient coupling from an optical fiber to a nanoscale silicon optomechanical cavity, Applied Physics Letters 103, 181104, Oct. 28, 2013.

Patel, et al., Efficient Photon Coupling from a Diamond Nitrogen Vacancy Centre by Integration with Silica Fibre, arXiv:1502.07849v1 [physics.optics], Mar. 2, 2015.

* cited by examiner

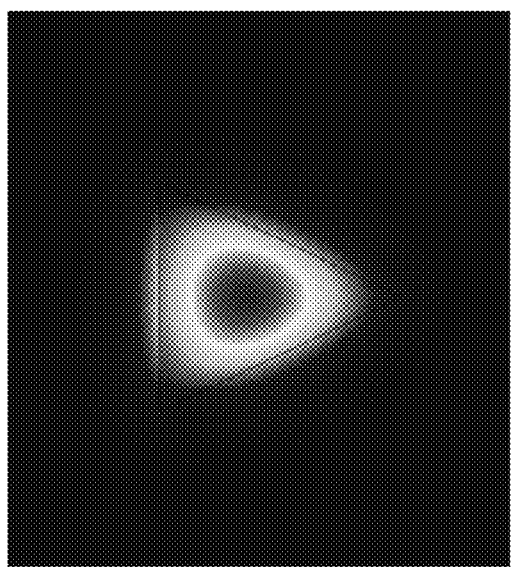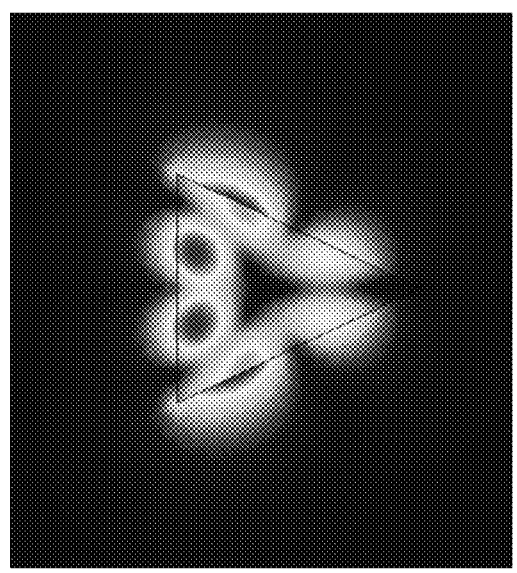
FIG. 9A
FIG. 9B

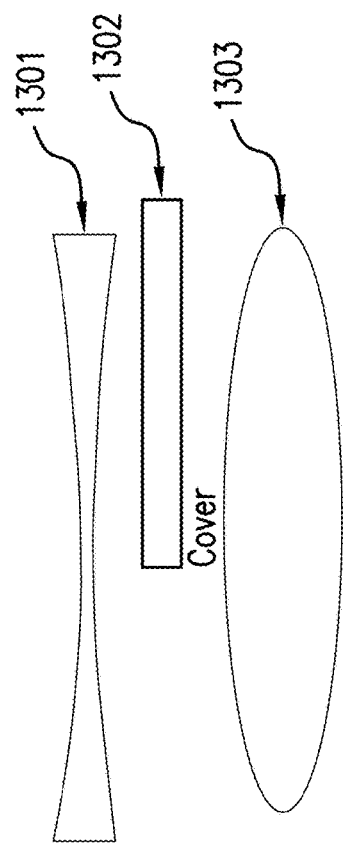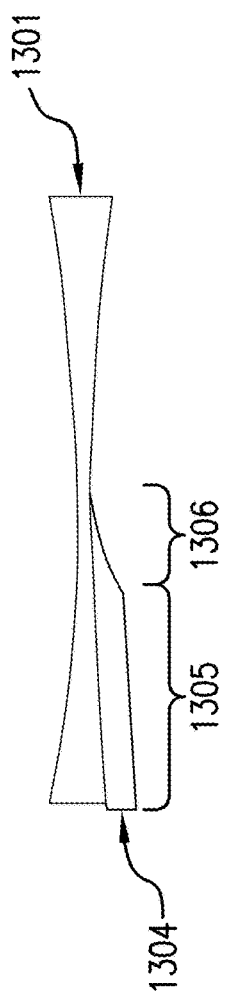

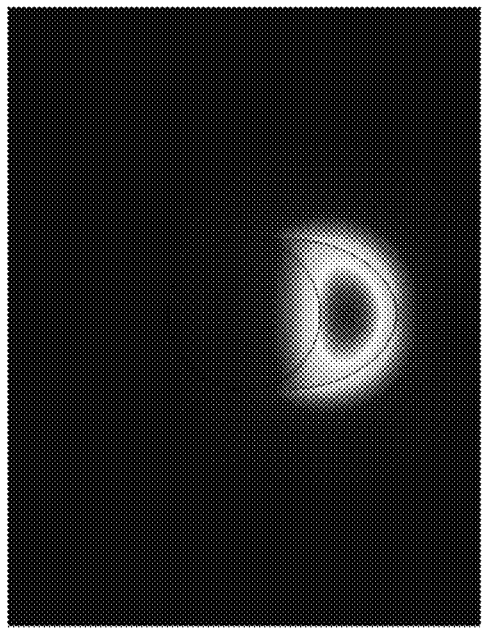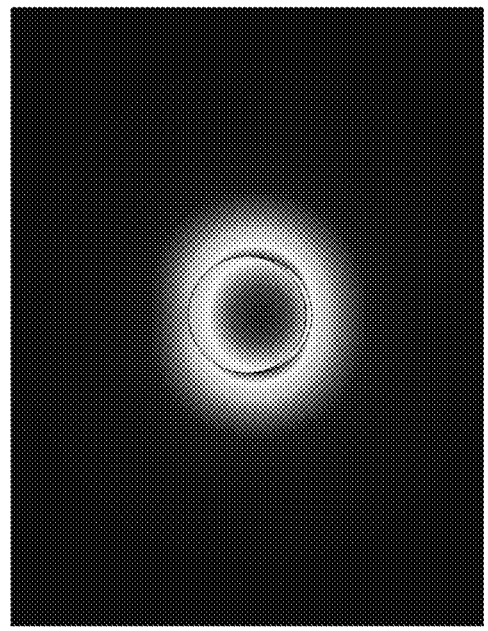
FIG. 15A
FIG. 15B

APPARATUS FOR COUPLING TO HIGH-INDEX MICRO-RESONATORS WITH TAPERED OPTICAL FIBERS

This invention was made with Government support under grant number W31P4Q-15-1-0013 awarded by the Defense Advanced Research Projects Agency (DARPA) and grant number DGE1144152 awarded by the National Science Foundation (NSF). The Government has certain rights to this invention.

BACKGROUND

Embodiments of the present invention relate to optical couplers, and more specifically, to the addition of tapered waveguides made of high-index material attached to a tapered optical fiber, enabling access to the optical modes of large, high index resonators.

BRIEF SUMMARY

According to some embodiments of the present disclosure, a device for optical coupling is provided. An optical fiber has a central axis, a tapered portion, and an untapered portion. The tapered portion is configured to expose an evanescent field. An elongated waveguide is optically coupled to the optical fiber along the tapered portion and parallel to the central axis of the optical fiber. The elongated waveguide has a substantially triangular cross section perpendicular to the central axis of the optical fiber.

According to other embodiments of the present disclosure, a device for optical coupling is provided. An optical fiber has a radius, a central axis, a tapered portion, and an untapered portion. The tapered portion is configured to expose an evanescent field. An elongated waveguide is coupled to the optical fiber along the tapered portion and parallel to the central axis of the optical fiber. The elongated waveguide has a cross section perpendicular to the central axis of the optical fiber. The cross section has an arcuate convex edge and an arcuate concave edge. The concave edge has a radius approximately equal to the radius of the optical fiber.

According to other embodiments of the present disclosure, methods of fabricating an elongated waveguide optically coupled to an optical fiber are provided. A cover is positioned between an optical fiber and a sputtering plasma source to form a shadowed region and an unshadowed region of the optical fiber. A material is deposited by the sputtering plasma source onto the optical fiber. An elongated waveguide is formed thereby disposed parallel to the central axis of the optical fiber. The elongated waveguide has a cross section in a plane perpendicular to the central axis of the optical fiber. The cross section has an arcuate convex edge and an arcuate concave edge. The concave edge has a radius approximately equal to the radius of the optical fiber and being substantially in contact with the optical fiber. The elongated waveguide has a substantially pointed end disposed on the shadowed region of the optical fiber.

BRIEF DESCRIPTION OF THE SEVERAL VIEWS OF THE DRAWINGS

FIGS. 9A-B illustrate simulated modal profiles for a micro-resonator according to embodiments of the present disclosure.

FIGS. 13A-C illustrate a method of manufacture of a coupling apparatus according to embodiments of the present disclosure.

FIGS. 15A-B are cross-sectional views of a coupling apparatus according to embodiments of the present disclosure.

DETAILED DESCRIPTION

Figure 1:
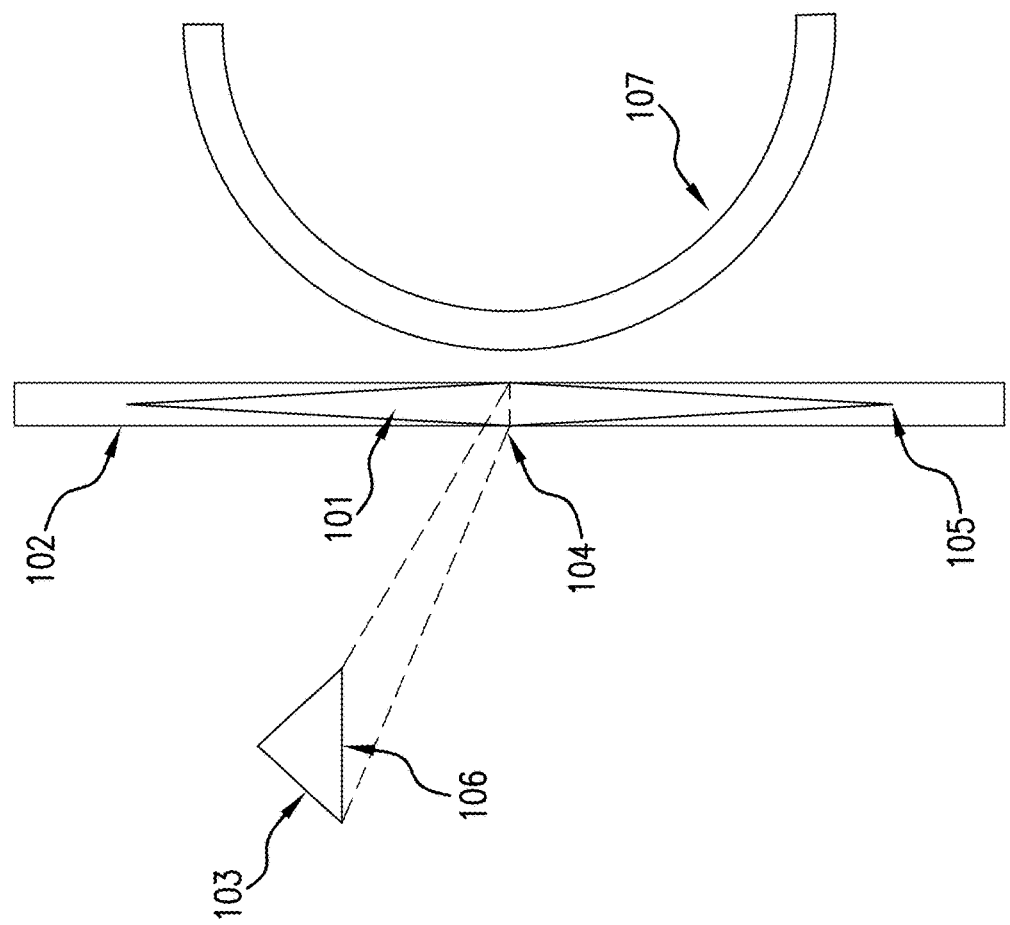
FIG. 1 is a schematic view of a coupling apparatus according to embodiments of the present disclosure.

Tapered silica fibers may be used to rapidly probe the optical properties of micro-resonators. However, their low refractive index precludes phase-matching when directly coupling to high-index micro-resonators, reducing efficiency.

The present disclosure provides for efficient optical coupling from tapered fibers to high-index micro-resonators by loading the fibers with an ancillary adiabatic waveguide-coupler. In some embodiments, the waveguide-coupler (or silicon loader waveguide) is fabricated via angled-etching. Couplers according to the present disclosure demonstrate enhanced coupling to a silicon multimode micro-resonator when compared to coupling via the bare fiber only. Signatures of resonator optical bistability are observed at high powers. Couplers according to the present disclosure are applicable to resonators of any size and material, increasing the functional scope of fiber coupling.

Efficient coupling of light to and from an integrated chip is useful for many applications in nonlinear optics, optomechanics, and quantum optics. A wide range of techniques may be used to deliver light on-chip, such as end-recoupling, planar gratings, or optical fiber coupling to dispersion-engineered photonic crystal waveguides. However, many applications are based on materials where full integration with couplers is difficult or rapid testing is desired. In such cases, silica fiber tapers, where an optical fiber is pulled to have a thin coupling region with thickness on the order of the wavelength, may form the foundation for optical experiments in diverse environments. In particular, silica fiber tapers display ideal coupling to silica resonators, with the ability to tune from under- to over-coupled based on taper positioning.

For high-index micro-resonators, the refractive index contrast results in a large propagation constant mismatch between the resonator and the tapered silica fiber, limiting the coupling efficiency into the resonator. This problem is exacerbated in larger, multimodal resonators where the fundamental mode is confined mostly in the material. Alternative schemes, such as prism coupling, or separate on-chip waveguides brought near to the resonator of interest, are bulky and do not allow for rapid testing of multiple components.

According to various embodiments of the present disclosure, an ancillary, support waveguide attached directly to an optical fiber is provided. This coupler improves upon the index matching between the optical fiber and a resonator of interest or other optical device. Using this platform, we show efficient coupling to the fundamental modes of a multi-modal silicon micro-resonator. In particular, we fabricate a tapered, free-standing, angle-etched silicon waveguide which we then detach and affix to the tapered section of an optical fiber. This achieves adiabatic mode conversion between the optical fiber and the silicon waveguide, effectively changing the propagation constant of the input light to that of silicon, matching it to the resonator.

Referring now to FIG. 1, an exemplary coupling apparatus according to embodiments of the present disclosure is illustrated. Coupler 101 is in contact with optical fiber 102. In some embodiments, optical fiber 102 is a silica fiber. In some such embodiments, the silica fiber is a tapered fiber, such as discussed below with regard to FIG. 17. In some embodiments, coupler 101 has a triangular cross section 103 that varies in area from a maximum at center point 103 of coupler 101 to a minimum at ends 105 of coupler 101. In some embodiments, cross-section 103 is isosceles, and base 106 is in contact with optical fiber 102.

Coupler 101 is configurable to optically couple optical fiber 102 to waveguide 107. As set forth further below, coupler 101 is brought into proximity with waveguide 107, and may be further tuned by adjusting the relative position of coupler 101 and waveguide 107. In some configurations, coupler 101 is oriented axially around fiber 102 towards waveguide 107. A variety of materials and configurations are suitable for waveguide 107, including rings and racetracks.

Figure 2:
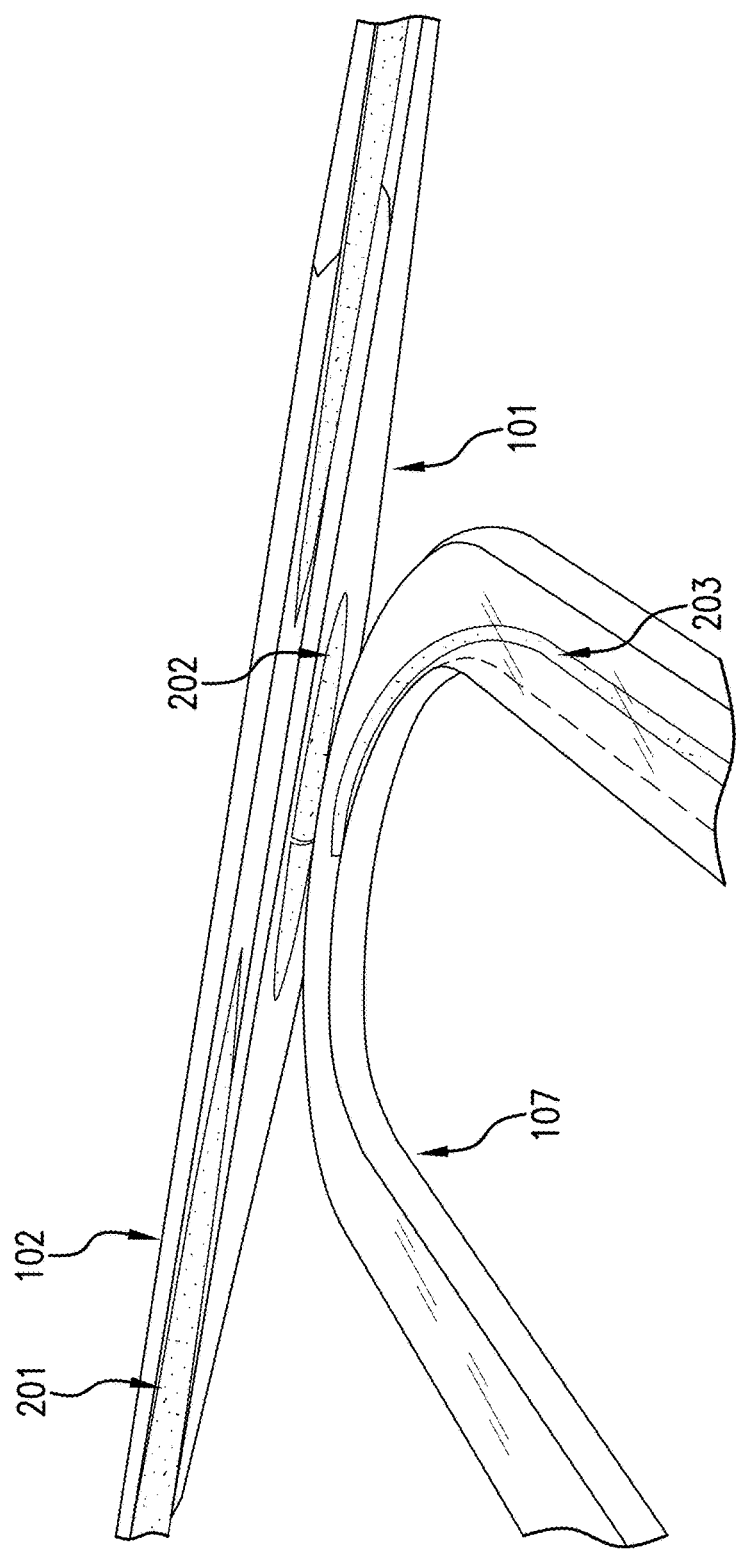
FIG. 2 is a perspective view of a coupling apparatus according to embodiments of the present disclosure.

Referring now to FIG. 2, an alternative view of coupler 101 is provided. Coupler 101 is in contact with optical fiber 102, and oriented towards waveguide 107. In this view, the path of a light pulse is illustrated during optical coupling between optical fiber 102 and resonator 107 through coupler 101. Pulse 201 initially travels along fiber 102. At 202, the pulse passes into coupler 101. At 203, the pulse passes from into resonator 107.

Figure 3:
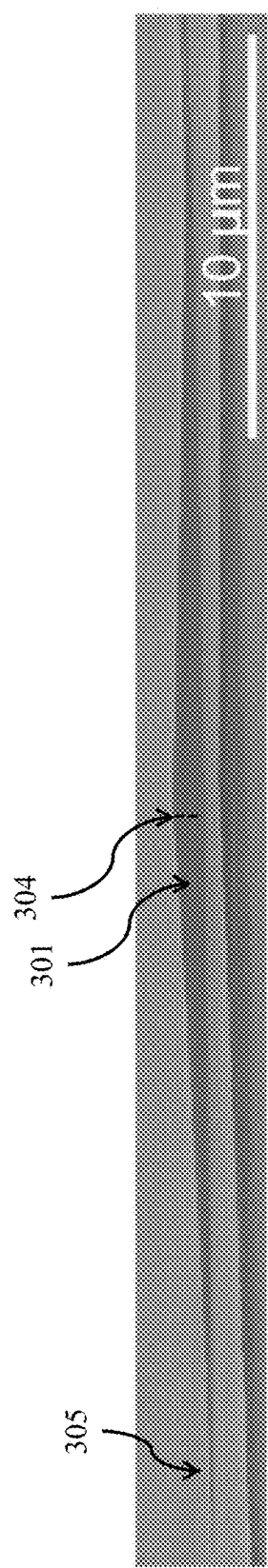
FIG. 3 is a scanning electron micrograph (SEM) side view of a coupling apparatus according to embodiments of the present disclosure.

FIG. 3 is a scanning electron micrograph (SEM) of an exemplary coupler according to the present disclosure, fabricated via Faraday cage angled-etching. The coupler 301 tapers down from a nominal width of 1 μm in the center 304 to points at the ends 305 over a length of 20 μm. The supporting fin present during fabrication is etched through, collapsing the device onto the substrate.

Figure 4:
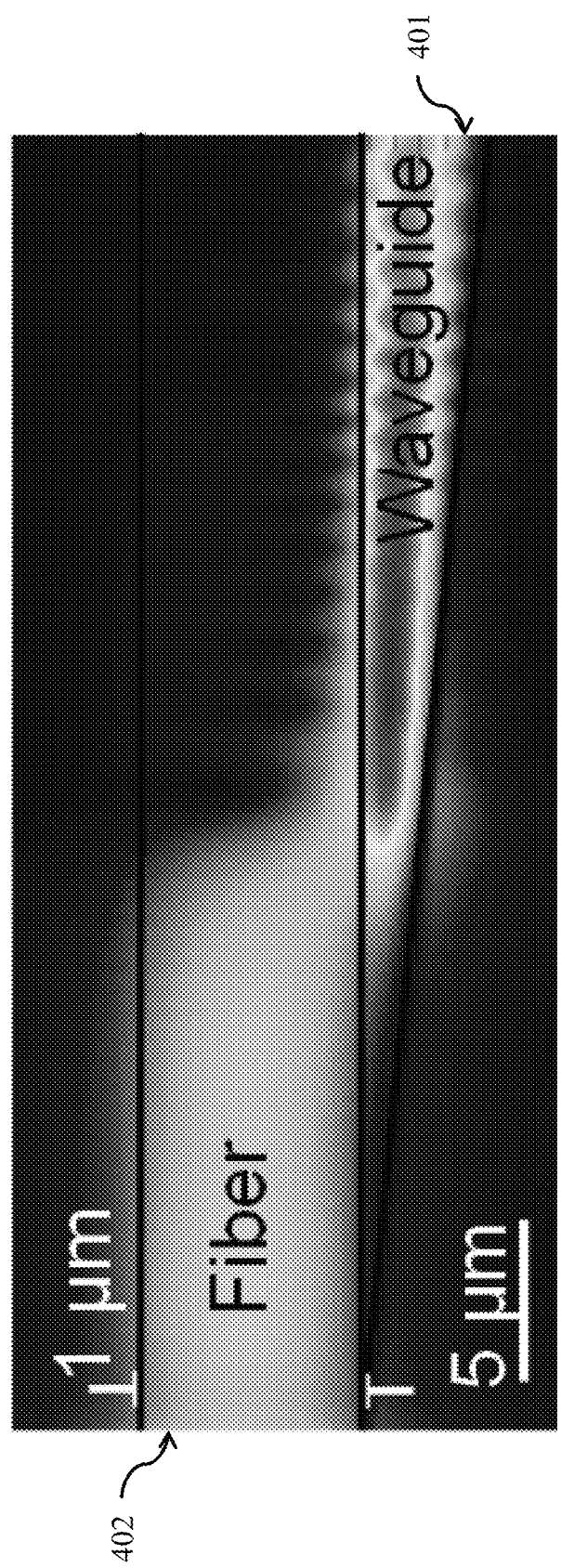
FIG. 4 illustrates a finite-difference time-domain (FDTD) simulation of a coupling apparatus according to embodiments of the present disclosure.

FIG. 4 illustrates a finite-difference time-domain (FDTD) simulation of a silicon adiabatic coupler 401 loaded to a tapered silica fiber 402 with diameter 1 μm. The mode originally stays in the silica fiber before being drawn into the waveguide. The waveguide is shown coupling over 40 μm. The multimodal nature of the thicker end of the silicon waveguide visibly manifests itself as interference fringes in the normalized electric field.

Figure 5:
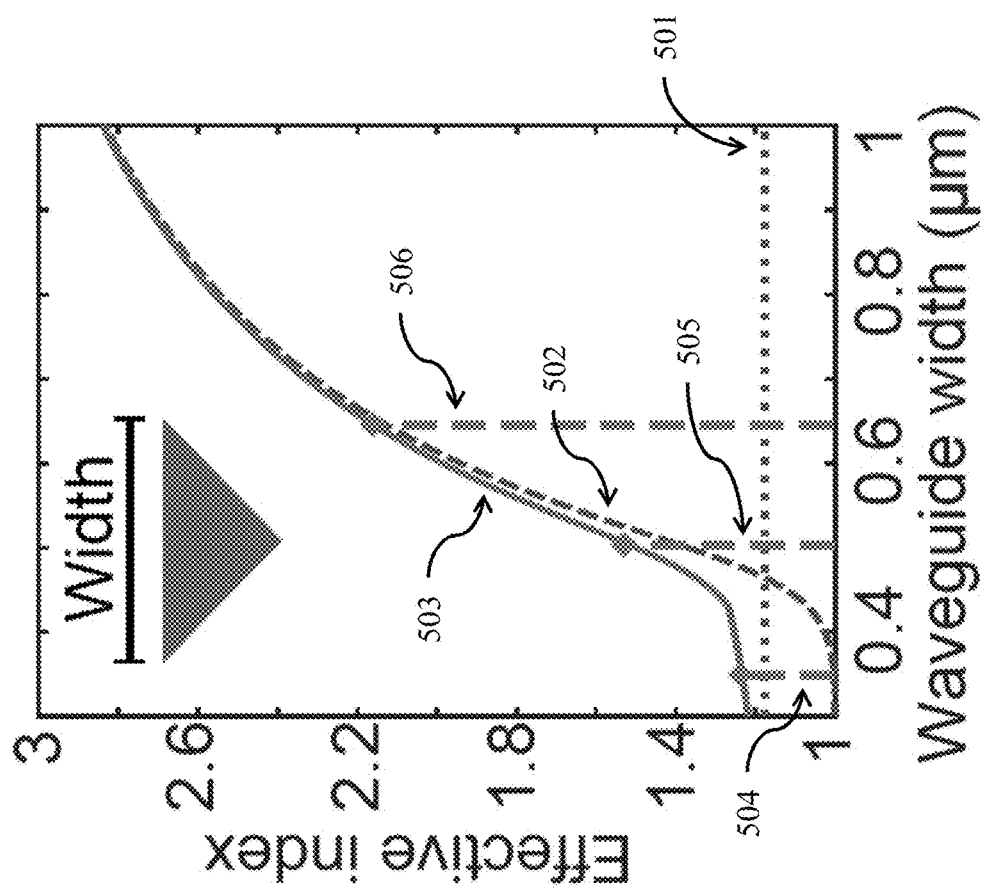
FIG. 5 illustrates simulations of the effective refractive index of a coupling apparatus according to embodiments of the present disclosure.
Figures 6A, 6B, 6C:
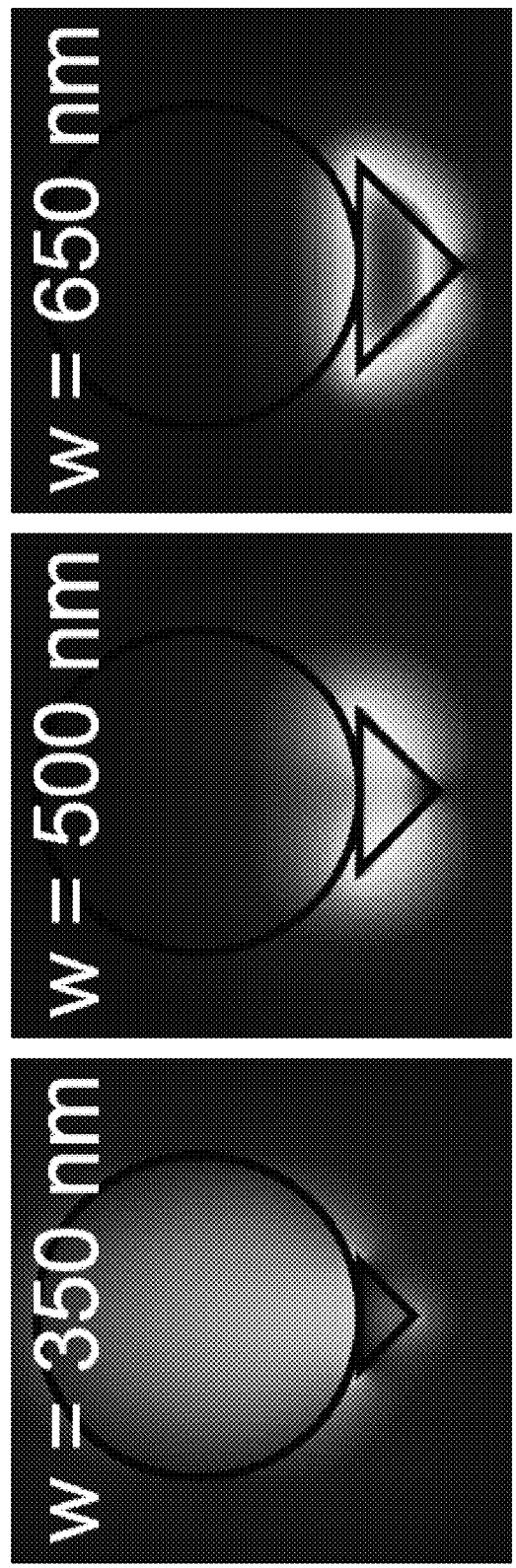
FIGS. 6A-C are cross-sectional views of a coupling apparatus illustrating simulated mode profiles according to embodiments of the present disclosure.

FIG. 5 illustrates FEM (Finite-Element Method) simulations (such as may be performed using COMSOL) of the effective refractive index of the tapered fiber (dotted line 501), silicon coupler device (dashed line 502), and supermode (solid line 503) as the width of the silicon coupler is increased from 300 nm to 1 μm. The dashed lines 504, 505, 506 correspond to the cross-sections shown in FIG. 6. In these exemplary embodiments, the coupler's cross-section is an isosceles triangle with equal angles of 30°. FIGS. 6A-C illustrate supermodes obtained at different cross-sectional widths of a silicon adiabatic coupler loaded to tapered fiber according to embodiments of the present disclosure. FIG. 6A depicts a cross-sectional base width of 350 nm, FIG. 6B depicts a cross-sectional base width of 500 nm, and FIG. 6C depicts a cross-sectional base width of 650 nm.

For plane waves in homogeneous transparent media, the refractive index, n, quantifies the increase in the phase change per unit length caused by the medium. The effective refractive index, $n_{eff}$, has the analogous meaning for light propagation in a waveguide with restricted transverse extension. For multimodal waveguides, the effective refractive index depends both on the wavelength and on the mode in which the light propagates. Accordingly, it is sometimes referred to as the modal index. The effective index depends both on the material and on the waveguide design.

Energy transfer between waveguides can be modeled via coupled mode theory. For two waveguides in close proximity with propagation constants $\beta_1$ and $\beta_2$, field amplitudes $A_1$ and $A_2$, and mutual coupling $\kappa$, the coupled mode equations may be written as in Equation 1, where z is the length dimension along the direction of propagation. These equations can be solved analytically. In particular, if light is only injected into one waveguide, then the power in the second waveguide as a function of distance is given by Equation 2, where we define $\delta=(\beta_2-\beta_1)/2$. Under this formulation, the maximum power coupled into the second waveguide cannot exceed $P_{max}=1/(1+(\delta/\kappa)^2)$. The corresponding length such that $P(L_C)=P_{max}$ is given by Equation 3, which indirectly depends on wavelength through $\delta$ and $\kappa$. In particular, for a fixed coupling constant $\kappa$, the power coupled in ($P_{max}$) decreases rapidly as a function of increasing effective refractive index mismatch ($\delta$). This underlies the difficulty of coupling to high-index micro-resonators from optical fibers.

$$\begin{cases} \frac{dA_1}{dz} = i\kappa A_2 e^{i(\beta_2-\beta_1)z} \\ \frac{dA_2}{dz} = i\kappa^* A_1 e^{-i(\beta_2-\beta_1)z} \end{cases} \quad \text{Equation 1}$$

$$P(z) = \frac{1}{1+(\delta/\kappa)^2}\sin^2\left(\sqrt{\kappa^2+\delta^2}\,z\right) \quad \text{Equation 2}$$

$$L_C = \frac{\pi}{2\sqrt{\kappa^2+\delta^2}} \quad \text{Equation 3}$$

In contrast to coupled mode theory, adiabatic coupling requires the breaking of translational symmetry in order to transfer optical energy across waveguides. This technique allows coupling light out of optical fibers and into target waveguides made of silicon, silicon nitride and diamond. According to various embodiments of the present disclosure, the mode is adiabatically transferred from an optical fiber into such a waveguide (alternatively referred to as a coupler of a loader waveguide), using the converted mode to efficiently couple to an index-matched micro-resonator.

Figure 7C:
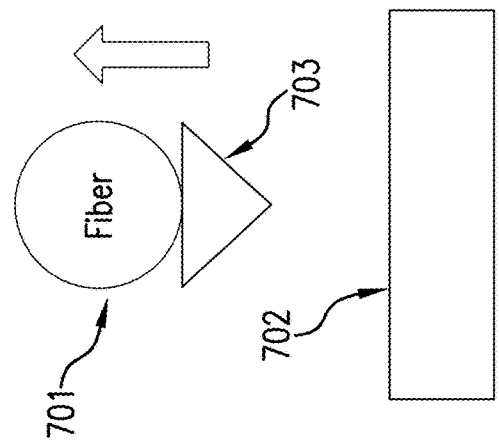
FIGS. 7A-C illustrate a method of manufacture of a coupling apparatus according to embodiments of the present disclosure.
Figure 7B:
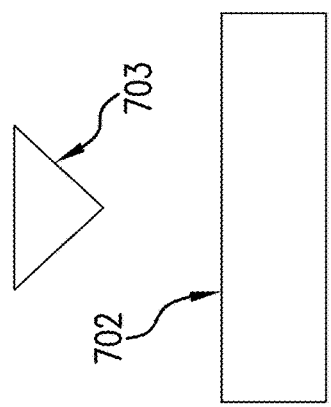
Figure 7A:
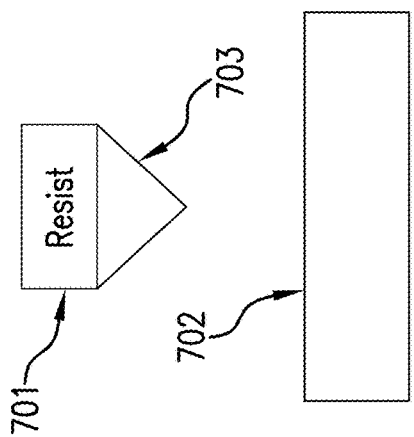

Referring now to FIG. 7, a method of manufacture of a coupler according to the present disclosure is illustrated. Although the below description is framed with regard to a coupler waveguide and a resonator, it will be appreciated that the techniques described herein are suitable for fabrication of various waveguides and resonators.

In some embodiments, the coupler waveguide and resonator are fabricated via angled-etching within a Faraday cage. After a resist mask 701 is defined, the pattern is first etched vertically. In a second step, a Faraday cage is placed around the sample, directing the incident etching ions to the substrate 702 at an angle defined primarily by the cage geometry. In order to leave the structure 703 suspended, the etch is timed to end before the structure 703 is completely undercut. The final etch profile shows a three-dimensional taper since the etch depth is defined via the width from the etch angle. This can yield adiabatic coupling over shorter intervals compared to thin film platforms. Because the operating principle of angled-etching is agnostic to the etch chemistry, it is suitable for a number of materials, including diamond, quartz, and silicon.

Once sample etching is complete, the resist 701 is removed and the coupler waveguide 703 is manually detached from the substrate 702. In some embodiments, resist 701 is removed by hydrofluoric acid (HF) vapor etching. Thereafter, it is transferred to a tapered optical fiber 704 (diameter ~1 µm) by bringing the fiber 704 into contact as it lies on the substrate. As the waveguide 703 is completely detached from the substrate, the fiber's attractive forces (van der Waals forces) are sufficient to pull the device off. Afterwards, the coupler waveguide 703 is manipulated against features on the sample until it lies parallel to the fiber 704. During the loading process no visible damage is done to the fiber, although the fiber transmission reduces to ~0.92%. As the loading process is not done in a controlled environment in some embodiments, large scattering centers such as dirt or dust on the silicon chip can be picked up by the fiber. Alternate methods of loading, including those performed within a vacuum or controlled environment, can increase the overall transmission of this design.

Figure 8A:
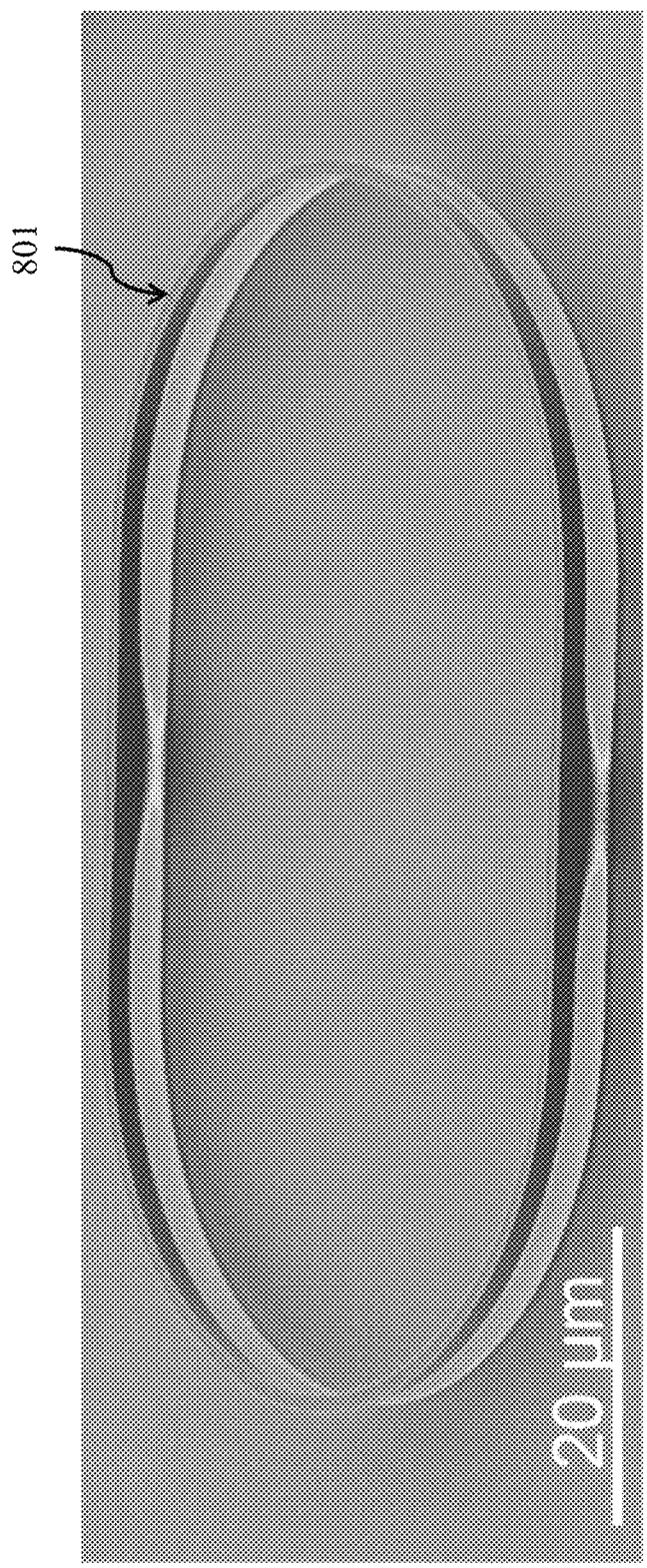
FIGS. 8A-C are SEM images of a micro-resonator according to embodiments of the present disclosure.
Figure 8B:
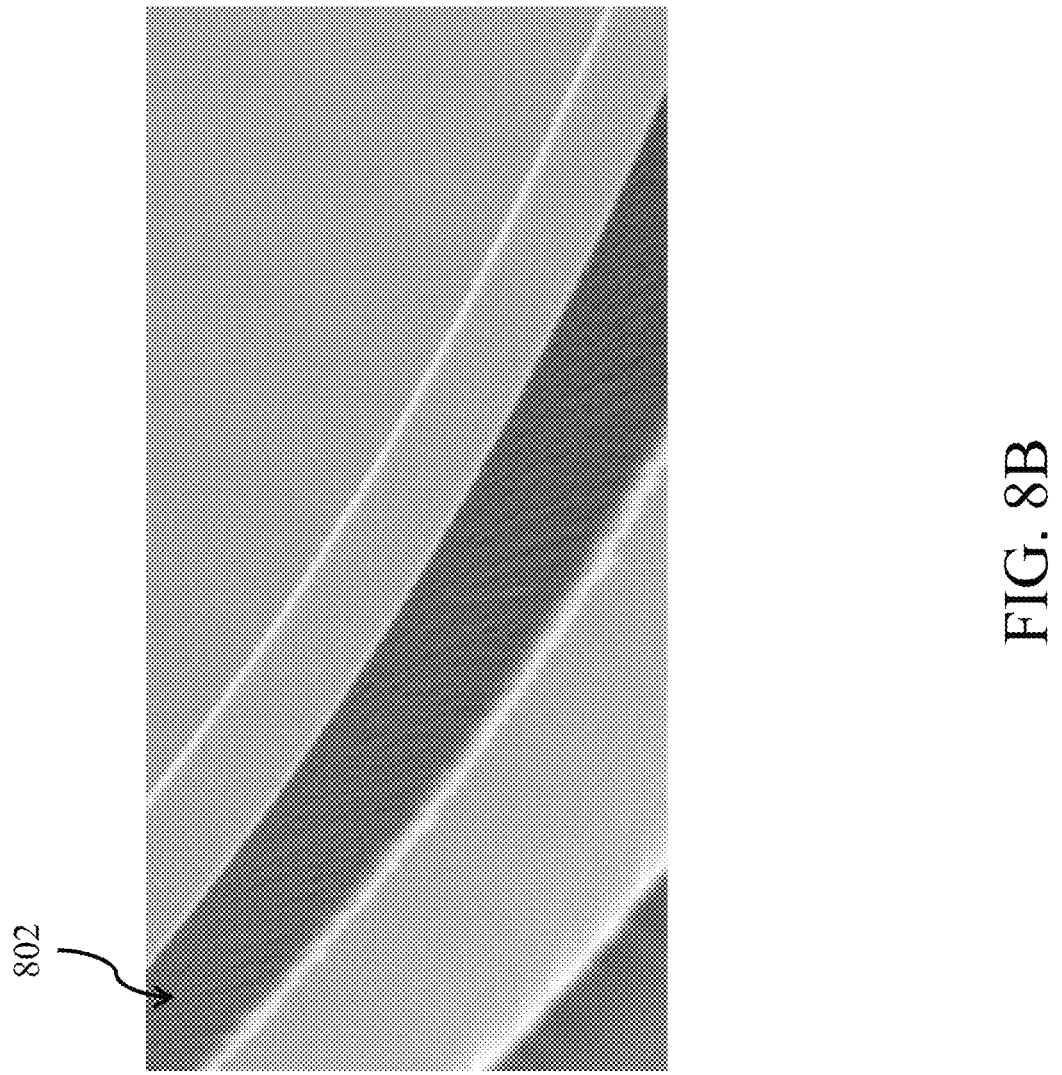
Figure 8C:
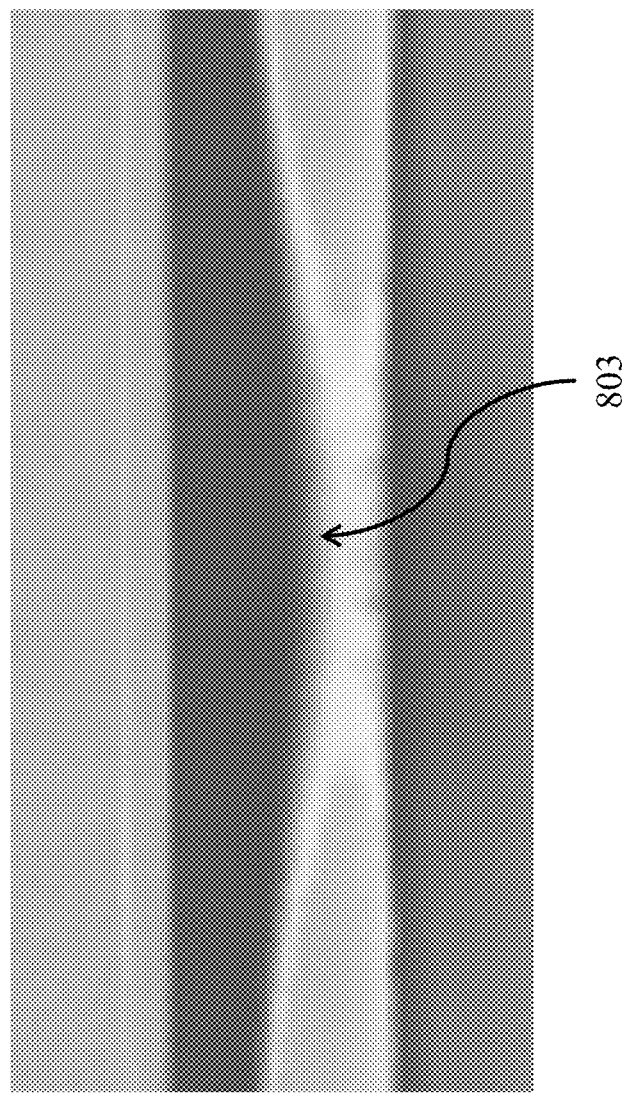

Referring to FIG. 8, an exemplary suspended silicon resonator etched via angled-etching is depicted. By selectively widening the patterned area and precisely timing the etch, a fully suspended resonator is created with supporting sections ensuring sufficient distance (~2 µm) from the substrate. The nominal width of exemplary resonator 801 is while the support region is 1.1 µm wide. The bending radius of resonator 801 is 25 µm and the etching angle is seen from SEM to be ~65°. The cross-sectional area is sufficiently large to support several transverse modes in the structure. FIG. 8A is a SEM image of silicon micro-resonator 801 fabricated with angled-etching. The bending radius is 25 µm while the straight region is 25 µm. A hydrogen silsesquioxane (HSQ) mask is defined via electron-beam lithography and the structure is etched in a SF6/C4F8 chemistry. FIG. 8B shows slight waveguide roughness 802 visible on the SEM. FIG. 8C shows that the structure is supported above the substrate by silicon fins 803. This is done by timing the etch so that material remains under the widened support sections.

It will be appreciated that an optical ring resonator generally comprises a ring-shaped, closed loop, that may variously be characterized as a ring or racetrack. Additional resonator geometries include discs, cylinders, and spheres, each of which is likewise suitable for use according to the present disclosure. The geometry of a resonator is analogous to that of a whispering gallery. When light of the resonant wavelength is passed through the loop from an input waveguide, it builds up in intensity over multiple round-trips due to constructive interference. Because only a select few wavelengths will be at resonance within the loop, the optical ring resonator also generally functions as a filter. Such optical ring resonators have a variety of important uses in photonic systems. For example, the optical ring resonator may be part of a photonic filter. The optical ring resonator may also be employed as an element in a photonic frequency multiplexer used to select a particular frequency portion of an input optical signal. Certain ring resonators, such as the exemplary resonator described herein display optical bistability, having two resonant transmission states.

Referring to FIG. 9, simulated modal profiles at $\lambda_0=1.52$ µm for exemplary resonator 801 are depicted using an extracted etch angle of 65°. FIG. 9A shows fundamental mode for the structure, with a calculated effective refractive index of 3.19 ($n_{eff}=3.19$, $n_g=3.85$). FIG. 9B shows the higher-order mode, with a calculated effective refractive index of 1.52 ($n_{eff}=1.52$), significantly lower than that of the fundamental modal profile for the higher-order modes. Seen through the lens of coupled mode theory, this implies that the higher-order mode should couple more easily to the bare optical fiber (effective refractive index ~1.4). Furthermore, as seen in the mode profiles, the higher-order mode has more electric field concentrated on the sides of the waveguide. This implies that it interacts more with any surface roughness and adsorbed molecules, limiting the Q-factor of this mode family. In contrast, the fundamental mode is relatively isolated from the surface, resulting in a higher predicted Q-factor. In addition to these considerations, the multimode nature of the silicon resonator may increase losses during the transition region by the supports, causing coupling between mode families and limiting the observed Q-factors. For these reasons the Q-factors are not necessarily limited by material absorption. However, the fundamental mode has a much larger Q-factor than any other mode.

Figure 10A:
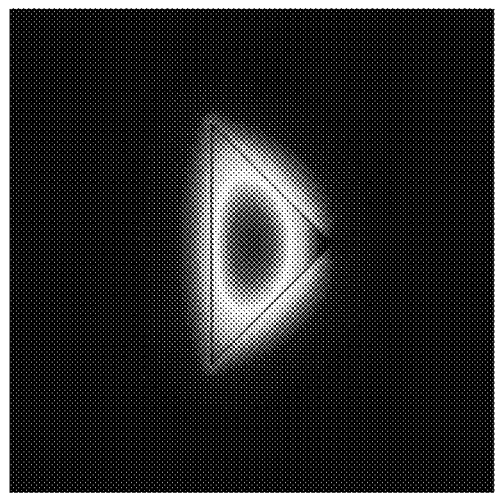
FIGS. 10A-B illustrate simulated modal profiles for another micro-resonator according to embodiments of the present disclosure.
Figure 10B:
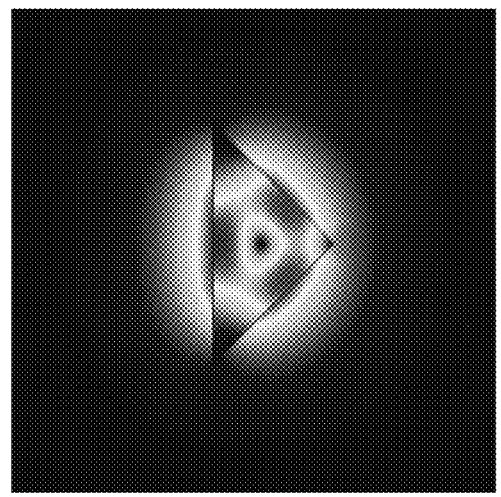

FIG. 10 depicts simulated modal profiles for a resonator with an etch angle of 45°. FIG. 10A shows the fundamental mode for the structure, with a calculated effective refractive index of 2.68 ($n_{eff}=2.68$). FIG. 10B shows a higher-order mode, with a calculated effective refractive index of 1.57 ($n_{eff}=1.57$).

In an exemplary testing protocol, after loading the fiber with the silicon waveguide, the fiber was brought near the micro-resonator. The transmission spectrum was monitored continuously over a narrow bandwidth as the fiber was moved closer. The position of the fiber was controlled in 50 nm increments via stepper motor. Because the effective refractive index of the loaded waveguide changes along its direction of propagation, all three spatial dimensions were used to tune the coupling to the resonator. Within the context of coupled mode theory, the coupling constant ($\kappa$) was tuned by changing the height of the fiber off the substrate and its lateral distance to the resonator, while the effective refractive index contrast ($\delta$) was modified by translating the fiber along its length.

FIG. 11 illustrates silicon micro-resonator spectra measured for bare fiber and fiber loaded with a coupler as described above. The data shown in FIG. 11 were taken at optimized coupling locations either at a bare fiber section or at the section containing the loaded waveguide. A tunable telecom laser (Santec TSL-510) scanned the resonator as the transmission collected by a photoreceiver was monitored.

Figure 11A:
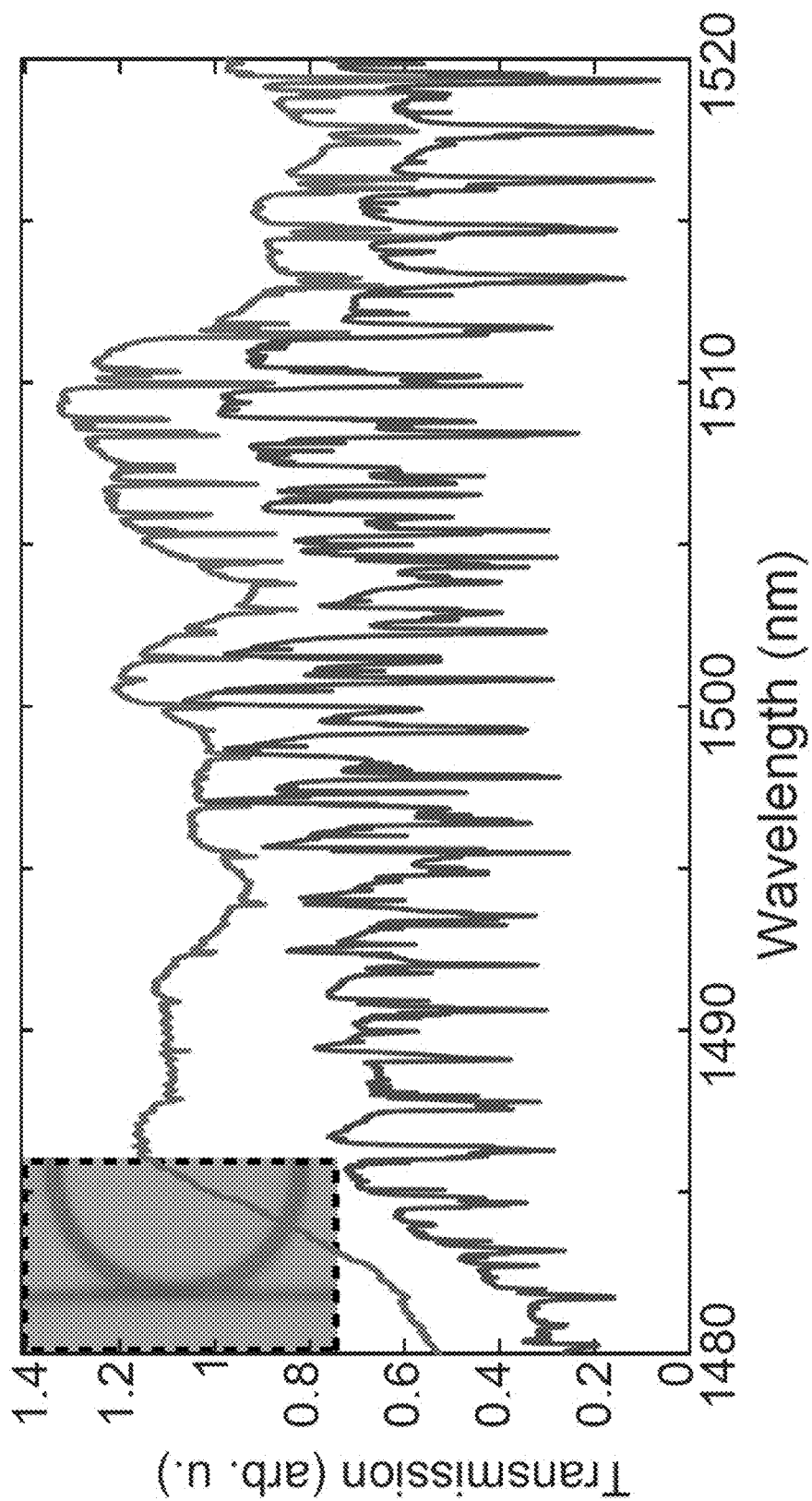
FIGS. 11A-E illustrate spectra of a micro-resonator according to embodiments of the present disclosure.

FIG. 11A illustrates transmission measurements of a silicon micro-resonator (inset) from 1480 nm to 1520 nm. The bare fiber result is shifted from the loaded fiber result for clarity. In the bare fiber case, the transmission dips are not consistent across the entire spectrum, petering off at shorter wavelengths. In contrast, the loaded fiber shows a consistent coupling for all modes in the same family, with transmission dips of ~40-60%. Under a large scan range, the difference between the loaded and unloaded section is apparent when looking at shorter wavelengths. The increased coupling bandwidth is a result of the better index-matching.

Figure 11B:
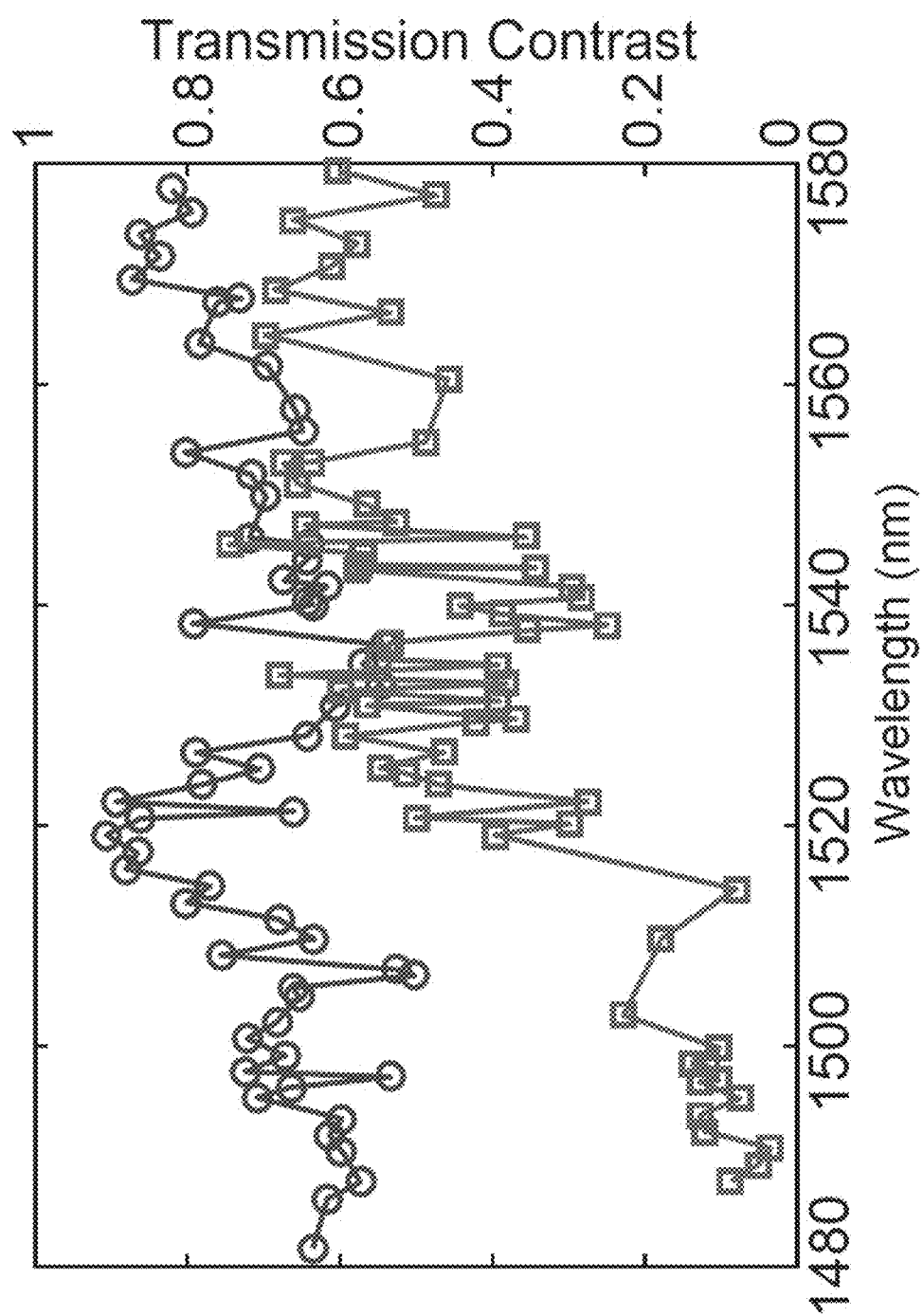

FIG. 11B illustrates extracted transmission contrast for highly-coupled resonances as a function of wavelength under bare and waveguide-loaded coupling. In the tested geometry, the length over which there is significant mode overlap between the resonator and the fiber is fixed due to the curvature of the resonator. Furthermore, the effective refractive indices of the silicon device and resonator both vary strongly as a function of wavelength, whereas the index of the bare fiber varies weakly so. Because the loader waveguide and resonator have similar cross-sections, their indices are expected to have a similar dependence on wavelength. In the context of coupled-mode theory, this implies that δ for the waveguide-loaded fiber-resonator system depends weakly on wavelength whereas δ for the bare fiber-resonator system depends on it strongly. This, in turn, imparts a strong wavelength-dependence on the coupling into high-index resonators from bare fibers.

Figure 11C:
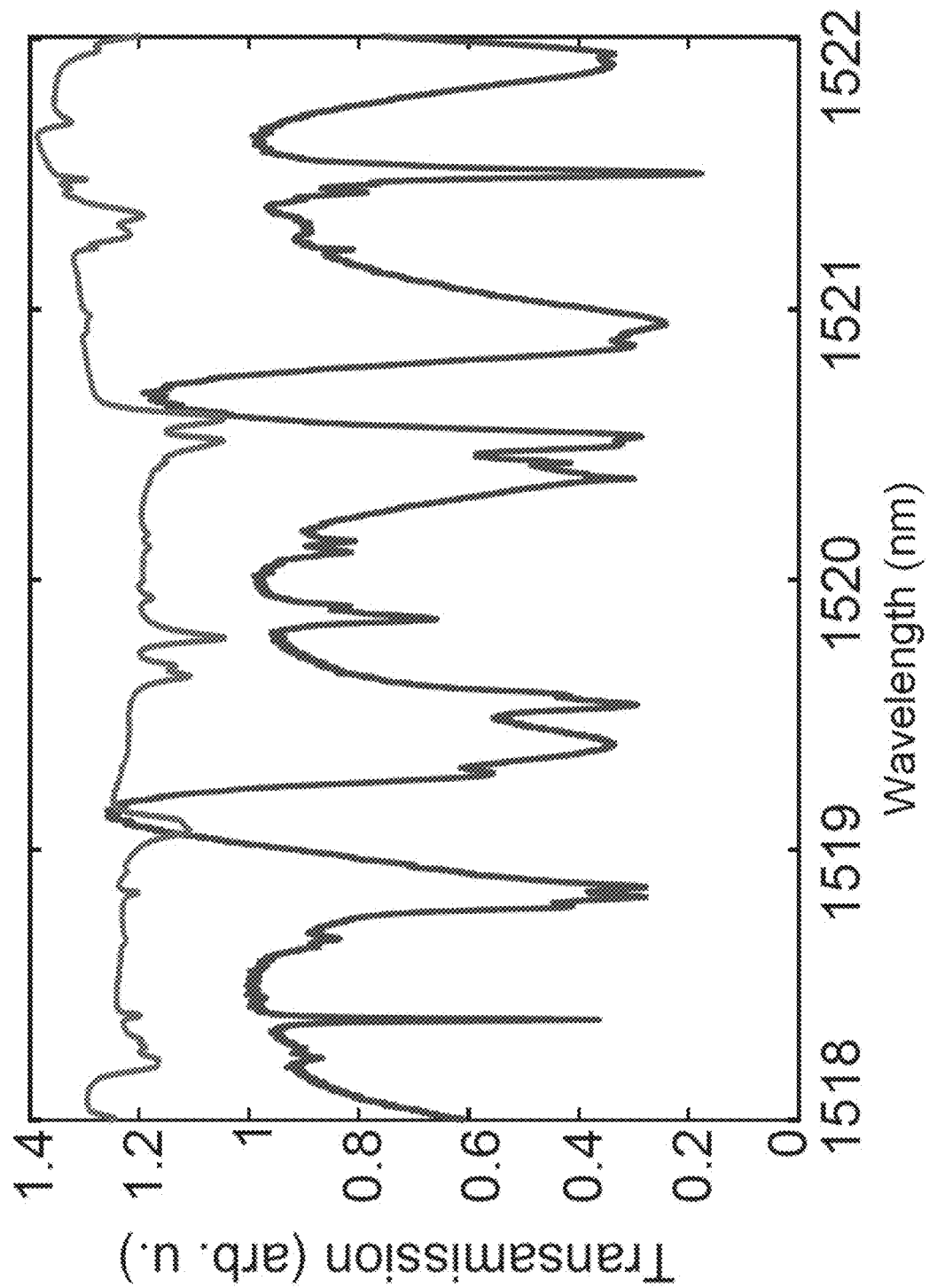

In addition to increased coupling bandwidth, transmission measurements of the resonator with the waveguide-loaded fiber showed the ability to access the high-effective index, fundamental modes of the device. FIG. 11C shows a scan taken at an optimized coupling position for wavelengths around 1520 nm. High-Q resonances can be seen at ~1518.4 nm and ~1521.5 nm. These modes are not visible when coupling with the tapered fiber alone.

The group index can be calculated from the free spectral range (FSR, Δv) as $\Delta v = c/(n_g L)$ where L is the resonator path length. These two modes give $n_g \approx 3.6$, which is close to the calculated value of $n_g = 3.85$. The discrepancy can be explained by differences between the simulated and actual waveguide dimensions. The modes are high-Q (~130,000 and ~40,000, respectively), suggesting that they are relatively well-isolated from any surface scattering or absorption compared to higher-order modes ($Q \sim 10^4$). Furthermore, both show large transmission contrast (~60%, ~80%, respectively), demonstrating that the waveguide-loaded fiber can efficiently transfer energy to the high-index modes of the resonator. The lower Q-factor of the second mode may be due to coupling with other resonances in the system. When the coupling is optimized at a particular wavelength, the power of the laser may be increased until optical bistability is observed, demonstrating the ability to transfer large amounts of power to the resonator.

Figure 11D:
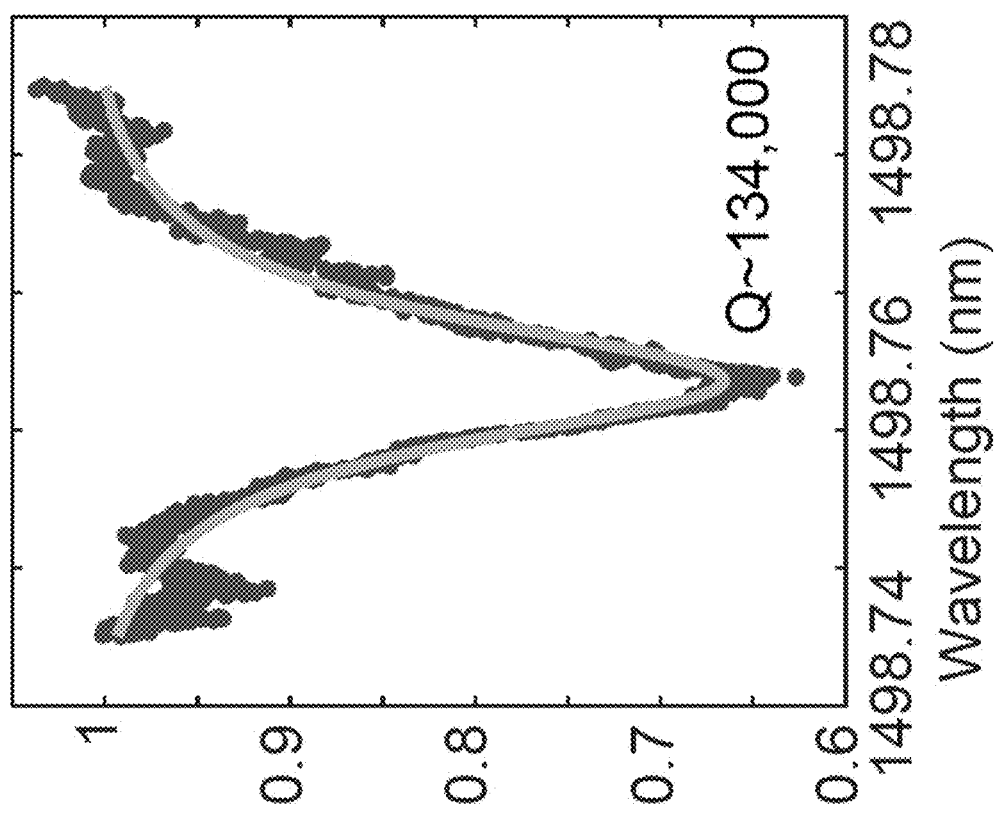

FIG. 11D illustrates a Lorentzian fit to a high-Q mode at short wavelengths, showing a Q of ~134,000.

Figure 11E:
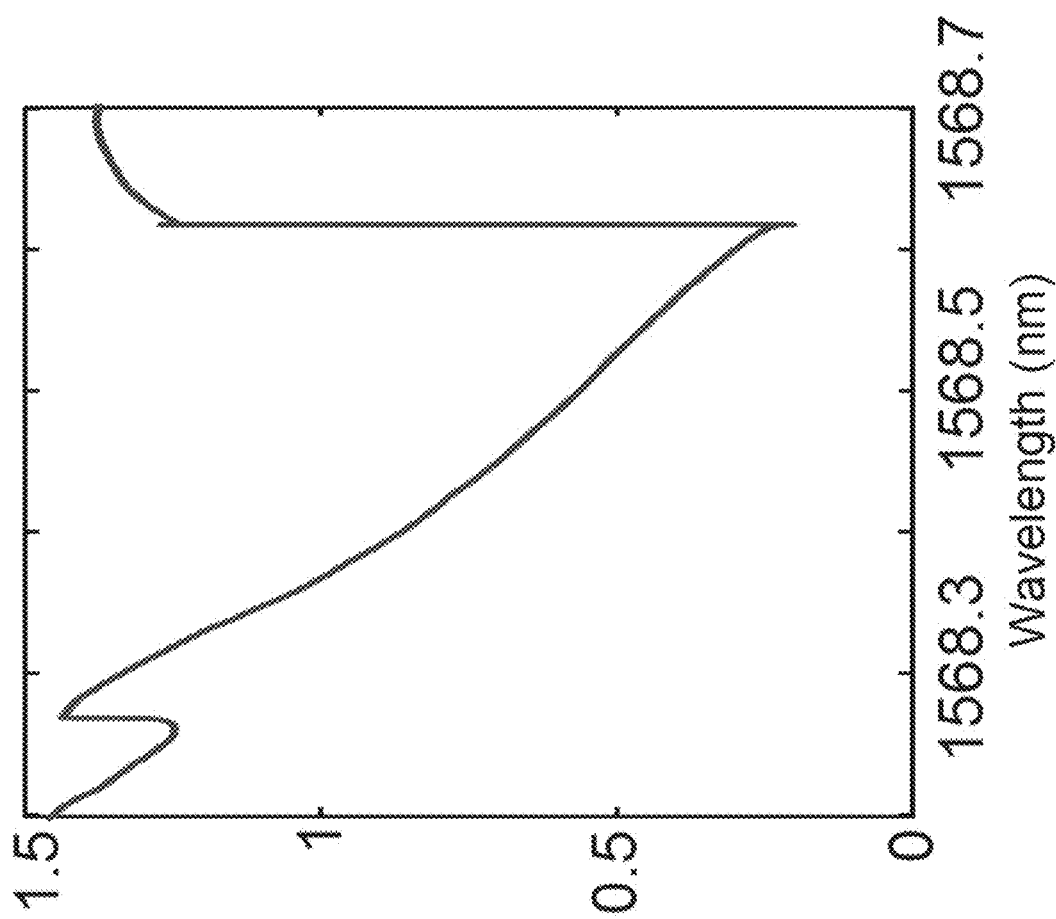

FIG. 11E illustrates a "shark-fin" shaped transmission dip characteristic of optical nonlinearities when pumping at ~138 μW of measured power. As the laser is tuned across the resonance, the resonance peak is red-shifted until some critical detuning where the resonance transitions to a regime where it is no longer coupled, resulting in a characteristic "shark-fin" shape. Additionally, no degradation in coupling was observed for higher powers, up to the maximum laser power available.

Accordingly, the present disclosure provides a versatile technique that enables coupling from an optical fiber to a free-standing high-index micro-resonator with peak efficiency approaching 80%. This result enables the rapid and large-scale optical probing of material systems useful in nonlinear and quantum optics such as diamond, chalcogenides, lithium niobate, or III-Vs. Shorter operating wavelengths for quantum photonics with single-photon emitters like NV centers in diamond micro-cavities can be obtained by fabricating the coupler waveguide with high-index materials transparent at visible wavelengths. Furthermore, the device can be tailored to the specific resonator by modifying the geometry of the coupling region, leading to highly efficient coupling directly to optical fibers.

Figure 12:
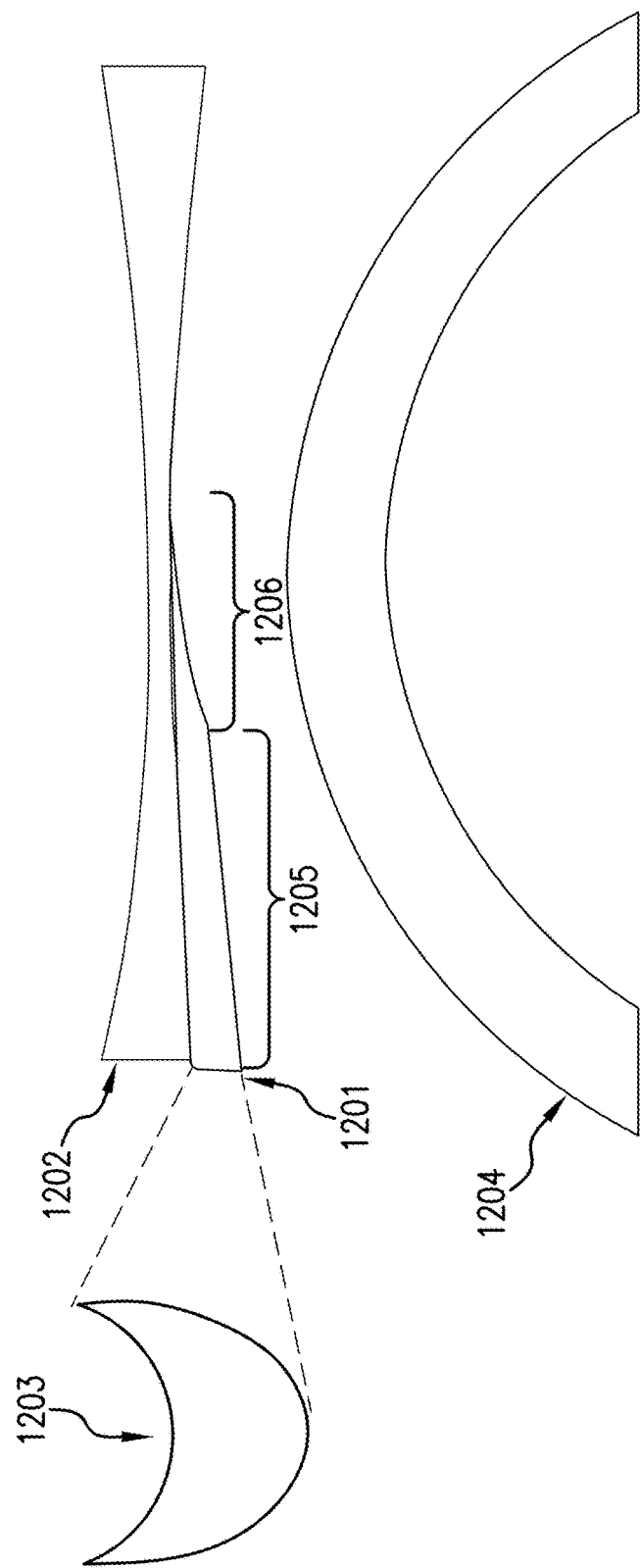
FIG. 12 is a schematic view of a coupling apparatus according to embodiments of the present disclosure.

Referring now to FIG. 12, another exemplary coupling apparatus according to embodiments of the present disclosure is illustrated. Coupler 1201 is in contact with optical fiber 1202. In some embodiments, optical fiber 1202 is a silica fiber. In some such embodiments, the silica fiber is tapered (as shown). In some embodiments, coupler 1201 has a triangular cross section. In some embodiments, the triangular cross-section is isosceles, and the base of the triangular cross-section is in contact with optical fiber 1202. In other embodiments, coupler 1201 has an approximately Reuleaux triangular cross section. In yet other embodiments, coupler 1201 has a cross section 1203 having two curved edges, a convex edge describing an approximately ovoid arc and a concave edge describing an approximately circular arc. In various embodiment, the cross section varies in area from a maximum at one end of coupler 1201 to a minimum at another end of coupler 1201. In some embodiments, coupler 1201 has portion 1205 having substantially consistent cross-sectional area, and a tapered portion 1206 over which the cross-sectional area decreases.

Coupler 1201 is configurable to optically couple optical fiber 1202 to waveguide 1204. Coupler 1201 is brought into proximity with waveguide 1204, and may be further tuned by adjusting the relative position of coupler 1201 and waveguide 1204. In some configurations, coupler 1201 is oriented axially around fiber 1202 towards waveguide 1204. A variety of materials and configurations are suitable for waveguide 1204, including rings and racetracks.

Referring to FIG. 13, a method of manufacture of a coupler according to the present disclosure is illustrated. Although the below description is framed with regard to a coupler waveguide and a resonator, it will be appreciated that the techniques described herein are suitable for fabrication of various waveguides and resonators.

A cover 1302 is positioned between tapered fiber 1301 and a sputtering plasma source. It will be appreciated that a variety of physical vapor deposition (PVD) methods are suitable for use in accordance with the present disclosure, including but not limited to ion-beam sputtering (MS), ion-assisted deposition (IAD), high-target-utilization sputtering, High-power impulse magnetron sputtering (HIPIMS), and gas flow sputtering. Shadowed sputter deposition of high-index material onto the tapered optical fiber is then performed.

The sputtering source deposits a portion 1305 having substantially consistent cross-sectional area outside the shadow of cover 1302, and a tapered portion 1306 extending below cover 1302, over which the cross-sectional area decreases. In this way, further manipulation and transfer of the coupler are avoided. These methods provide highly scalable means for coupling to high-index resonators. It will be apparent that such couplers are useful for technologies involving high-index whispering-gallery-mode resonators as well as microresonators.

Figure 14:
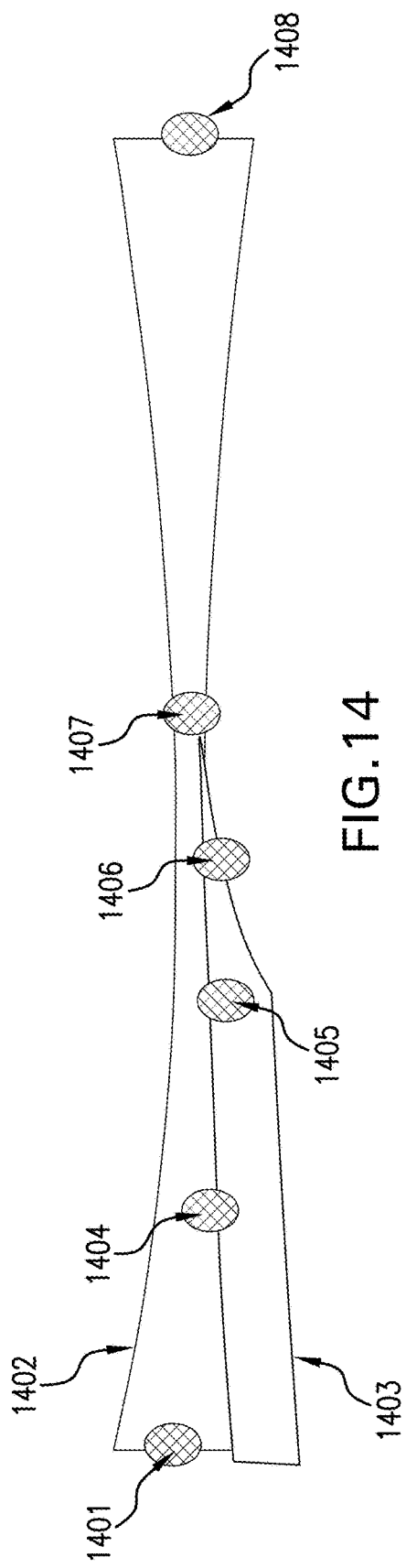
FIG. 14 illustrates the propagation of an optical mode through a coupling apparatus according to embodiments of the present disclosure.

Referring now to FIG. 14, the propagation of an optical mode through a coupler according to embodiments of the present disclosure is illustrated. At 1401, the optical mode begins in optical fiber 1402, separated from the high-index material of coupler 1403 by cladding. At 1404, the optical mode begins to transition to the high-index region as the diameter of fiber 1402 narrows. At 1405, the optical mode sits in the high-index region. At 1406, the optical mode begins to transition back into the fiber. At 1407, the optical mode is almost entirely back in the fiber. At 1408, the optical mode exits the fiber.

Referring to FIG. 15, cross sections of optical fiber 1402 and coupler 1403 are depicted. FIG. 15A depicts the optical mode in the high index region at point 1405. FIG. 15B depicts the optical mode back in fiber 1402 at point 1407.

Figure 16A:
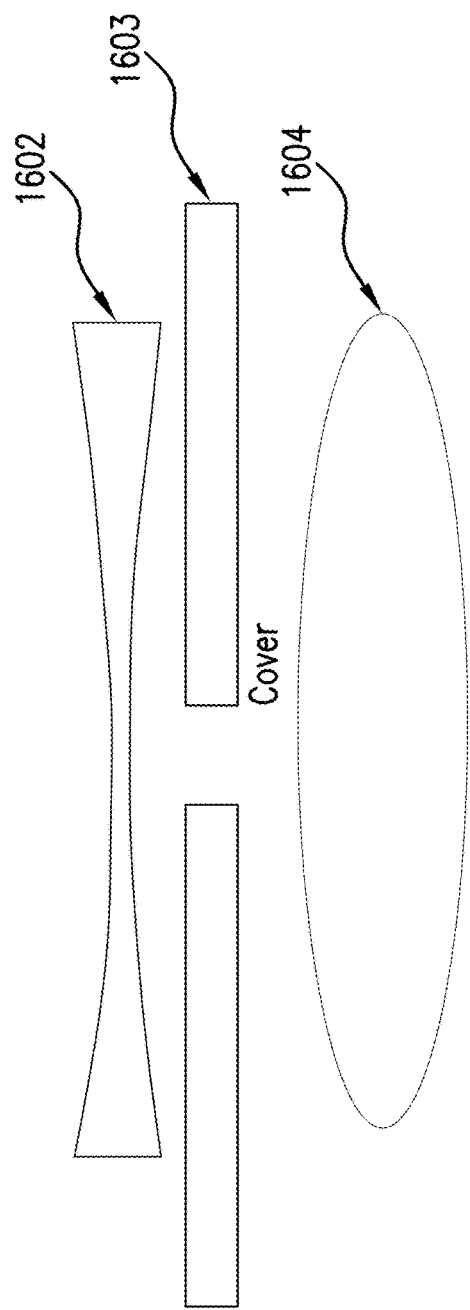
FIGS. 16A-B illustrate a method of manufacture and present a schematic view of another coupling apparatus according to embodiments of the present disclosure.
Figure 16B:
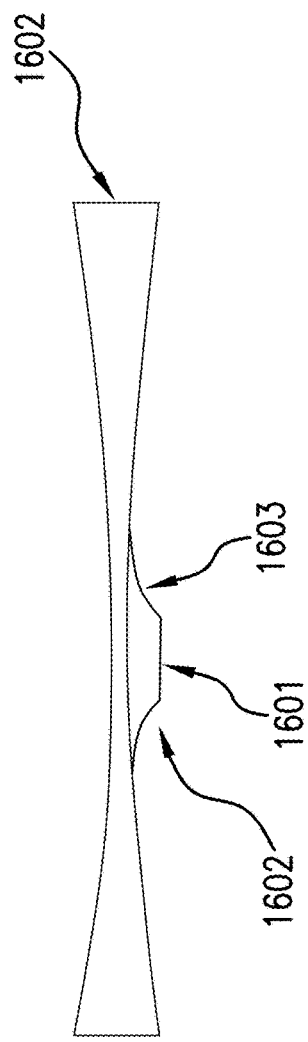

Referring to FIG. 16, another embodiment of the coupler of FIG. 12 is depicted. Coupler 1601 has tapered portions 1602, 1603 on both ends. A cover 1603 having a central opening is positioned between tapered fiber 1602 and a sputtering plasma source 1604. Shadowed sputter deposition of high-index material onto the tapered optical fiber is then performed. The sputtering source deposits a portion having substantially consistent cross-sectional area beneath the opening of cover 1603, and a dual tapered portions 1602, 1603 extending below cover 1603, over which the cross-sectional area decreases.

Figure 17:
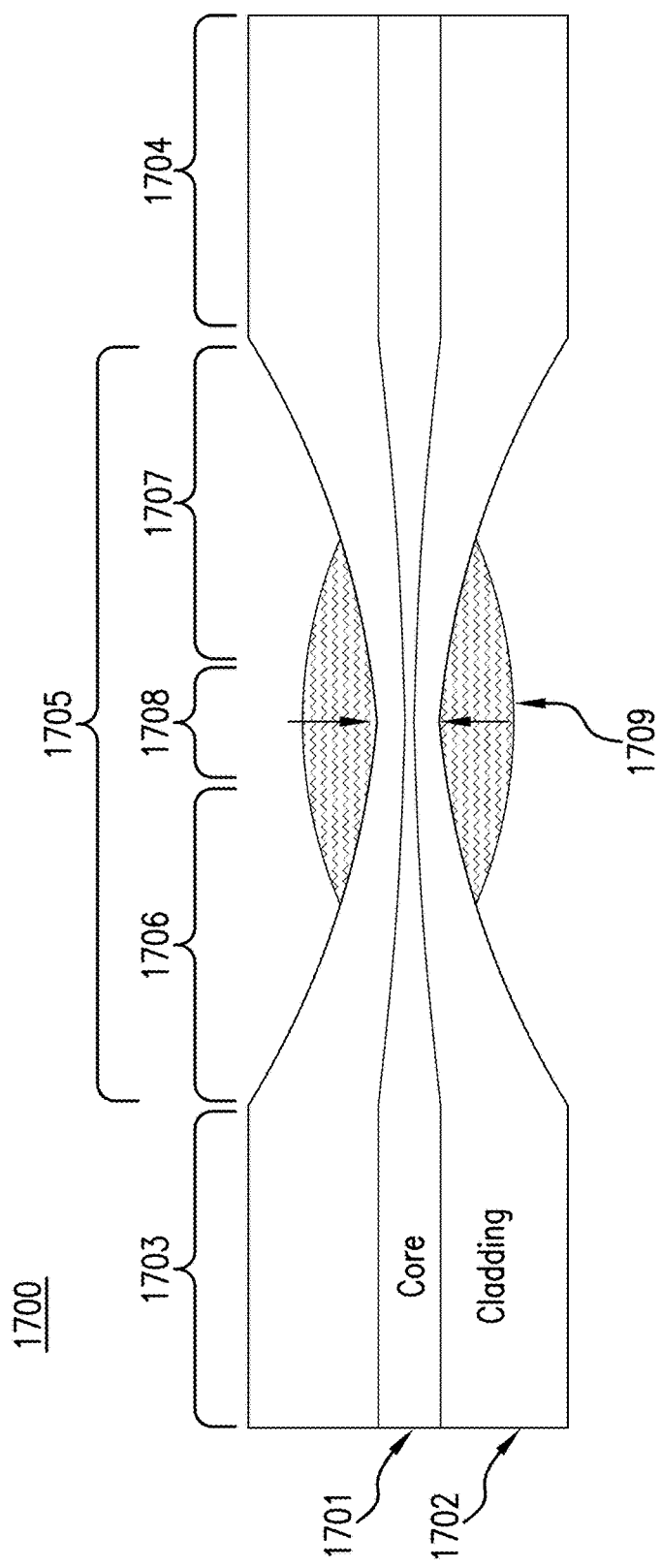
FIG. 17 is a schematic view of optical fiber according to embodiments of the present disclosure.

Referring now to FIG. 17, an exemplary tapered fiber is illustrated. Fiber 1700 comprises a core 1701 and cladding 1702. Fiber 1700 has untapered portions 1703, 1704. Between untapered portions 1703, 1704 is a tapered portion 1705 comprising transition regions 1706, 1707 and a taper waist 1708. In some embodiments, the taper is formed by heating and drawing an optical fiber. The tapered portion exposes the evanescent field 1709 of the transmitted light, allowing it to interact with the surroundings. Couplers according to various embodiments of the present disclosure are positioned along the tapered portion 1705 of the fiber in order to interact with evanescent field 1709, and thereby optically couple to fiber 1700.

Light propagating through an optical fiber consists of two components: the guided field in the core and the exponentially decaying evanescent field in the cladding. In a uniform-diameter fiber, the evanescent field decays to almost zero within the cladding. Thus, light propagating in uniform-diameter cladded fibers generally does not interact with the fiber's surroundings. However, if the cladding of a fiber is reduced or removed, the evanescent field is exposed and can interact with the surroundings. The distance to which the evanescent field extends beyond the core-cladding interface is described by the penetration depth, which is the distance where the evanescent field decreases to 1/e of its value at the core-cladding interface.

Tapering not only exposes the evanescent field to the surroundings, but also increases the evanescent field magnitude and penetration depth. Tapering can be performed by removing the cladding and then tapering the core, or keeping both the core and cladding in place and tapering the entire fiber, for example by heating and drawing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device comprising:
an optical fiber, the optical fiber having a central axis, a tapered portion, and an untapered portion, the tapered portion configured to expose an evanescent field; and
an elongated waveguide optically coupled to the optical fiber along the tapered portion and disposed parallel to the central axis of the optical fiber, the elongated waveguide having a substantially triangular cross section in a plane perpendicular to the central axis of the optical fiber.

2. The device of claim 1, the elongated waveguide having two substantially pointed opposing ends, the ends disposed on the optical fiber.

3. The device of claim 2, the elongated waveguide having a maximal width at a midpoint.

4. The device of claim 3, wherein the maximal width is about 1 µm.

5. The device of claim 2, wherein an effective refractive index of the elongated waveguide is less than an effective refractive index of the optical fiber at each of the opposing ends of the elongated waveguide.

6. The device of claim 5, wherein the effective refractive index of the elongated waveguide is greater than the effective refractive index of the optical fiber at a midpoint of the elongated waveguide.

7. The device of claim 1, the substantially triangular cross section being isosceles.

8. The device of claim 7, the substantially triangular cross section having two angles of about 30°.

9. The device of claim 1, wherein the substantially triangular cross-section is oriented such that an edge is tangent to the optical fiber.

10. The device of claim 1, the optical fiber comprising silica.

11. The device of claim 1, the tapered portion having a minimal diameter of about 1 µm.

12. The device of claim 1, the elongated waveguide comprising diamond, quartz, or silicon.

13. The device of claim 1, wherein the elongated waveguide is coupled to the optical fiber by van der Waals forces.

14. The device of claim 1, further comprising:
a resonator optically coupled to the elongated waveguide.

15. The device of claim 1, wherein the elongated waveguide has a length parallel to the central axis of the optical fiber of about 40 µm.

* * * * *